United States Patent Office 2,786,065
Patented Mar. 19, 1957

2,786,065
ESTERS OF 4-HYDROXYCOUMARIN

Hugh R. Eisenhauer, Madison, and Karl Paul Link, Middleton, Wis., assignors to Wisconsin Alumni Research Foundation, Madison, Wis., a corporation of Wisconsin No Drawing. Application May 18, 1953,
Serial No. 355,861

5 Claims. (Cl. 260—343.2)

The present invention relates to 4-hydroxycoumarin compounds and the process of preparing the same. More specifically the invention relates to esters of 4-hydroxycoumarin in which the substituent at the 4-position is selected from the group consisting of

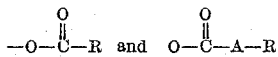

where R is a phenyl group, substituted or unsubstituted, and A is selected from the group consisting of saturated and unsaturated aliphatic hydrocarbons or lower alkyl residues. The following examples will serve to illustrate the invention.

GENERAL METHOD

About 1.5 moles of the phenyl- or phenyl alkyl-CO-halide are slowly added to a cooled (0° C.) solution of pyridine containing about 1 mole of 4-hydroxycoumarin with or without a small amount of piperidine. About one to two minutes after the completion of the addition of the acid halide, the reaction mixture is poured into a mixture of ice and dilute mineral acid. The desired ester product precipitates and is filtered, washed with water and then shaken with aqueous sodium bicarbonate solution to remove acidic components. For further purification, the products may be recrystallized from ethanol, ethanol-water, or any other suitable organic solvent. The yield is very good, ranging from about 95–100%.

*Example I.—4-benzoyloxycoumarin*

About 1.3 grams of benzoyl chloride is slowly added to a cooled (about 0° C.) solution of 8 cc. of pyridine containing about 1.0 gram of 4-hydroxycoumarin and about 1–2 drops of piperidine. About one minute after the complete addition of the benzoyl chloride, the reaction mixture is poured into a mixture of ice and about 50 cc. of dilute HCl. The desired ester which precipitates is recovered by filtration, washed with water and then shaken with a dilute water solution of sodium bicarbonate. The resulting product free from acidic contaminating materials is then finally recrystallized from ethanol. It has a melting point of 127–129° C. In the product of this example "R" is phenyl.

*Example II.—4-(o-acetoxybenzoyloxy)-coumarin*

This product is prepared in accordance with Example I by substituting o-acetoxybenzoyl chloride for the benzoyl chloride. The desired ester after recrystallization from ethanol had a melting point of 121–123° C.

*Example III.—4-(m-acetoxybenzoyloxy)-coumarin*

This product is prepared in accordance with Example I by substituting m-acetoxybenzoyl chloride for the benzoyl chloride. The desired ester after recrystallization from ethanol had a melting point of 128–129° C.

*Example IV.—4-(p-acetoxybenzoyloxy)-coumarin*

This product is prepared in accordance with Example I by substituting p-acetoxybenzoyl chloride for the benzoyl chloride. The desired ester after recrystallization from ethanol had a melting point of 162–164° C.

*Example V.—4-(3,4-diacetoxybenzoyloxy)-coumarin*

This product is prepared in accordance with Example I by substituting 3,4-diacetoxybenzoyl chloride for the benzoyl chloride. The desired ester after recrystallization from ethanol had a melting point of 155–156° C.

*Example VI.—4-(3,4,5-triacetoxybenzoyloxy)-coumarin*

This product is prepared in accordance with Example I by substituting 3,4,5-triacetoxybenzoyl chloride for the benzoyl chloride. The desired ester after recrystallization from ethanol had a melting point of 170–174° C.

*Example VII.—4-(o-methoxybenzoyloxy)-coumarin*

This product is prepared in accordance with Example I by substituting o-methoxybenzoyl chloride for the benzoyl chloride. The desired ester after recrystallization from ethanol had a melting point of 121–123° C.

*Example VIII.—4-phenylacetoxycoumarin*

This product is prepared in accordance with Example I by substituting phenyl acetyl chloride for the benzoyl chloride. After recrystallization from ethanolbenzene the desired ester had a melting point of 156–158° C.

*Example IX.—4-cinnamoyloxycoumarin*

This product is prepared in accordance with the above examples by reacting the 4-hydroxycoumarin with cinnamoyl chloride. After recrystallization from ethanol the desired ester had a melting point of 156–158° C.

In Examples VIII and IX, "A," the unsaturated or saturated lower alkyl residue, represents, respectively, the following groups: —CH$_2$— and —CH=CH—; and "R" is phenyl. When the benzoyl halide of Example I is replaced with β-phenyl propionyl chloride, γ-phenyl butyryl chloride or γ-phenyl vinyl acetyl chloride, "A" represents, respectively, the groups —CH$_2$CH$_2$—; —CH$_2$CH$_2$CH$_2$— and —CH=CHCH$_2$—

In Examples II to VII, "R" represents a substituted phenyl group. The phenyl groups may also be substituted by one or more lower alkyl or alkoxy groups such as methyl, ethyl, ethoxy, etc., and by one or more halogen groups such as chlorine, bromine, etc., or by various combinations of lower alkyl, lower alkoxy and halogen groups or other monovalent substituents. The compounds of the present invention have mild anti-coagulant activity.

We claim:
1. The product, 4-(acetoxybenzoyloxy)-coumarin.
2. The product, 4-(o-acetoxybenzoyloxy)-coumarin.
3. The product, 4-(m-acetoxybenzoyloxy)-coumarin.
4. The product, 4-(p-acetoxybenzoyloxy)-coumarin.
5. The process of preparing the product of claim 1 which comprises adding acetoxybenzoyl chloride to 4-hydroxycoumarin in a cool solution of pyridine at about 0° C., mixing the resulting reaction mixture substantially immediately after the addition of the acid chloride with a mixture of ice and dilute hydrochloric acid, and recovering the precipitated ester product from the acidic mixture.

References Cited in the file of this patent
UNITED STATES PATENTS

| 2,345,635 | Stahmann et al. | Apr. 4, 1944 |
| 2,465,293 | Stahmann | Mar. 22, 1949 |

OTHER REFERENCES

Stahmann et al.: J. A. C. S., vol. 66, pp. 900–902 (1944).
Uketa et al.: J. A. C. S., vol. 72, pp. 5143–5144 (1950).
Overman et al.: J. Biol. Chem., vol. 153, p. 10 (1944).
Anschutz: Annalen 367, p. 199 (1909).
Fucik: Chem. Listy, vol. 46, pp. 190–192 (1952).